United States Patent
Sahashi

(10) Patent No.: US 9,592,785 B2
(45) Date of Patent: Mar. 14, 2017

(54) VEHICLE SEAT

(71) Applicant: TOYOTA BOSHOKU KABUSHIKI KAISHA, Aichi-ken (JP)

(72) Inventor: Hideo Sahashi, Komaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/931,216

(22) Filed: Nov. 3, 2015

(65) Prior Publication Data

US 2016/0129873 A1    May 12, 2016

(30) Foreign Application Priority Data

Nov. 7, 2014 (JP) .................................. 2014-226761

(51) Int. Cl.
*B60R 21/207* (2006.01)
*B60R 21/16* (2006.01)

(52) U.S. Cl.
CPC ...... *B60R 21/207* (2013.01); *B60R 2021/161* (2013.01)

(58) Field of Classification Search
CPC ............ B60R 21/207; B60R 2021/161; B60R 2021/2076; B60N 2002/5808
See application file for complete search history.

(56) References Cited

U.S. PATENT DOCUMENTS

| 2011/0057426 A1* | 3/2011 | Nakamura | .......... B60R 21/2176 280/730.2 |
| 2014/0284907 A1* | 9/2014 | Akiyama | .............. B60R 21/207 280/730.2 |

FOREIGN PATENT DOCUMENTS

| DE | 69322337 | 7/1999 | | |
| DE | 102004001216 | 7/2004 | | |
| DE | 69932210 | 5/2007 | | |
| JP | 2012-25361 | 2/2012 | | |
| JP | WO 2015080213 A1 | * | 6/2015 | ........... B60R 21/207 |
| SE | GB 2397047 A | * | 7/2004 | ........... B60R 21/207 |
| SE | EP 2842802 A1 | * | 3/2015 | ........... B60N 2/5816 |

OTHER PUBLICATIONS

U.S. Appl. No. 14/929,822 to Takeshi Ushiyama et al., filed Nov. 2, 2015.

* cited by examiner

*Primary Examiner* — Ruth Ilan

(74) *Attorney, Agent, or Firm* — Greenblum & Bernstein, P.L.C.

(57) ABSTRACT

A vehicle seat includes: a seat pad; and an air bag placed on a back side of the seat pad and configured to be expandable. The seat pad includes a jump-out portion and an unfolding portion extending. When the air bag jumps out, the unfolding portion is pushed aside while deforming in a bending manner from a part serving as a base point at the time when the unfolding portion is pushed aside by the air bag. The unfolding portion includes a deformable portion that is easy to deform as compared with other parts of the unfolding portion, the deformable portion being placed at the part serving as the base point, and at the time when the air bag jumps out, the deformable portion deforms so as promote the unfolding portion to deform in a bending manner so that the unfolding portion is pushed aside toward the one side.

6 Claims, 6 Drawing Sheets

VEHICLE SEAT

INCORPORATION BY REFERENCE

The disclosure of Japanese Patent Application No. 2014-226761 filed on Nov. 7, 2014 including the specification, drawings and abstract is incorporated herein by reference in its entirety.

BACKGROUND OF THE INVENTION

1. Field of the Invention

The present invention relates to a vehicle seat including a seat pad for elastically supporting an occupant, and an air bag (a member that jumps out of the seat pad while partially pushing the seat pad aside) in a seat.

2. Description of Related Art

As this type of vehicle seat, there has been known a vehicle seat including a seat cushion, and a seatback rising from the seat cushion (see Japanese Patent Application Publication No. 2012-25361 (JP 2012-25361 A)). In this vehicle seat, the seatback includes a seat frame (a generally arch-shaped frame body) that forms a seat framework, a seat pad made of foam resin and provided in the seat frame so as to elastically support an occupant, a seat cover that covers the seat pad, and an air bag. The air bag is a sack body that expands due to inflow of air, and is attached to the seat frame so as to be placed on a seat-side portion and a back side of the seat pad.

Further, the seat pad is a generally rectangular member forming a seat outer shape, and includes a sack-body passing portion (corresponding to a jump-out portion). The seat pad is configured such that its center in a width direction is flat so that an occupant can sit thereon, and a side portion of the seat pad (that part of the seat pad which is adjacent to the center of the seat pad in a seat width direction) projects toward a sitting side, which attains an excellent occupant support characteristic. Further, the sack-body passing portion is a hole portion penetrating through the seat pad in its thickness direction, and the sack-body passing portion is opened between the center of the seat pad and the side portion. In the technique as known in the art, at the time of a vehicle collision or the like, the air bag jumps out of the side portion of the seatback so as to protect a lateral side of the occupant. The air bag that expands at this time passes through the sack-body passing portion while pushing the side portion of the seat pad aside, and then jumps out of the seat by partially breaking the seat cover.

SUMMARY OF THE INVENTION

In the meantime, in the configuration of the technique as known in the art, the side portion of the seat pad projects toward the sitting side in consideration of the occupant support characteristic. On this account, in the technique as known in the art, the side portion of the seat pad (a part on the sitting side) may be hard to be pushed aside, which may cause such a possibility that it takes time for the air bag to jump out from the seat pad (an unfolding speed becomes slow). Though the side portion of the seat pad can be generally thinned, the occupant support characteristic may decrease. The present invention provides a vehicle seat that allows an air bag to jump out from a seat pad quickly while maintaining performance of the seat pad to the utmost.

A vehicle seat according to an aspect of the present invention includes: a seat pad forming a seat outer shape and elastically supporting an occupant; and an air bag placed on a back side of the seat pad and configured to be expandable due to inflow of air. The seat pad includes a jump-out portion which is fragile as compared with other parts of the seat pad and from which the air bag jumps out, and an unfolding portion extending from the jump-out portion toward one side of the seat. When the air bag jumps out from the jump-out portion while pushing the unfolding portion aside toward the one side, the unfolding portion is pushed aside while deforming in a bending manner from a part serving as a base point at the time when the unfolding portion is pushed aside by the air bag. The unfolding portion includes a deformable portion that is easy to deform as compared with other parts of the unfolding portion, the deformable portion being placed at the part serving as the base point, and at the time when the air bag jumps out, the deformable portion deforms so as to promote the unfolding portion to deform in a bending manner so that the unfolding portion is pushed aside toward the one side.

In the above aspect, since the unfolding portion is easily pushed aside at the deformable portion, the air bag can jump out from the seat pad quickly without thinning the unfolding portion.

In the above aspect, the deformable portion may be a recessed part. With this configuration, at the time when the air bag jumps out, the unfolding portion can be smoothly pushed aside toward a sitting side while the recessed part is deformed in an expanding manner.

In the above configuration, the seat pad may be a seat pad for a seatback, the deformable portion may be provided continually or intermittently in an up-down direction of the vehicle seat based on an uprising state of the seatback, and an upper part of the deformable portion in the up-down direction of the vehicle seat may have a depth dimension smaller than that of a lower part of the deformable portion. With this configuration, the unfolding portion that is gradually thickened from its upper part toward its lower part and is hard to be pushed aside can be smoothly pushed aside.

In the above aspect, the seat pad may include a back-surface material on a surface facing the air bag, and the deformable portion may be a part where the back-surface material is not provided. With this configuration, the deformable portion easily deforms in a stretching manner as compared with the other parts of the unfolding portion (parts integrated with the back-surface material), so that the unfolding portion can be smoothly pushed aside at the time when the air bag jumps out.

In the above aspect, lubricant may be applied to the deformable portion. With this configuration, the deformable portion maintains a stretching characteristic derived from the seat pad to the utmost, so that the deformable portion is easily stretched as compared with the other parts of the unfolding portion. Since the deformable portion is made slippery by application of the lubricant, when the deformable portion makes contact with other members (the air bag and the like) in a seat, abnormal noise (friction sound or the like) caused by the contact therebetween can be prevented appropriately.

According to the above aspect, the air bag can jump out of the seat pad quickly while performance of the seat pad is maintained to the utmost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment for carrying out the present invention with reference to FIGS. 1 to 7. Note that, in FIG. 2, a state in the middle of expansion of an air bag is illustrated by an alternate long and two short dashed line. Further, in each of the drawings, a reference sign F is assigned to a vehicle-seat front side, a reference sign B is assigned to a vehicle-seat rear side, a reference sign UP is assigned to a vehicle-seat upper side, a reference sign DW is assigned to a vehicle-seat lower side, a reference sign R is assigned to a vehicle-seat right side, and a reference sign L is assigned to a vehicle-seat left side, appropriately. A vehicle seat 2 in FIG. 1 includes a seat cushion 4, a seatback 6, and a headrest 8. These seat components each include: a seat frame (4F, 6F, 8F) forming a seat framework; a seat pad (4P, 6P, 8P) forming a seat outer shape; and a seat cover (4S, 6S, 8S) covering the seat pad. In the present embodiment, a lower part of the seatback 6 in an uprising state is connected to a rear part of the seat cushion 4 in a rising and tilting manner, and the headrest 8 is disposed on an upper part of the seatback 6.

Figure 1:
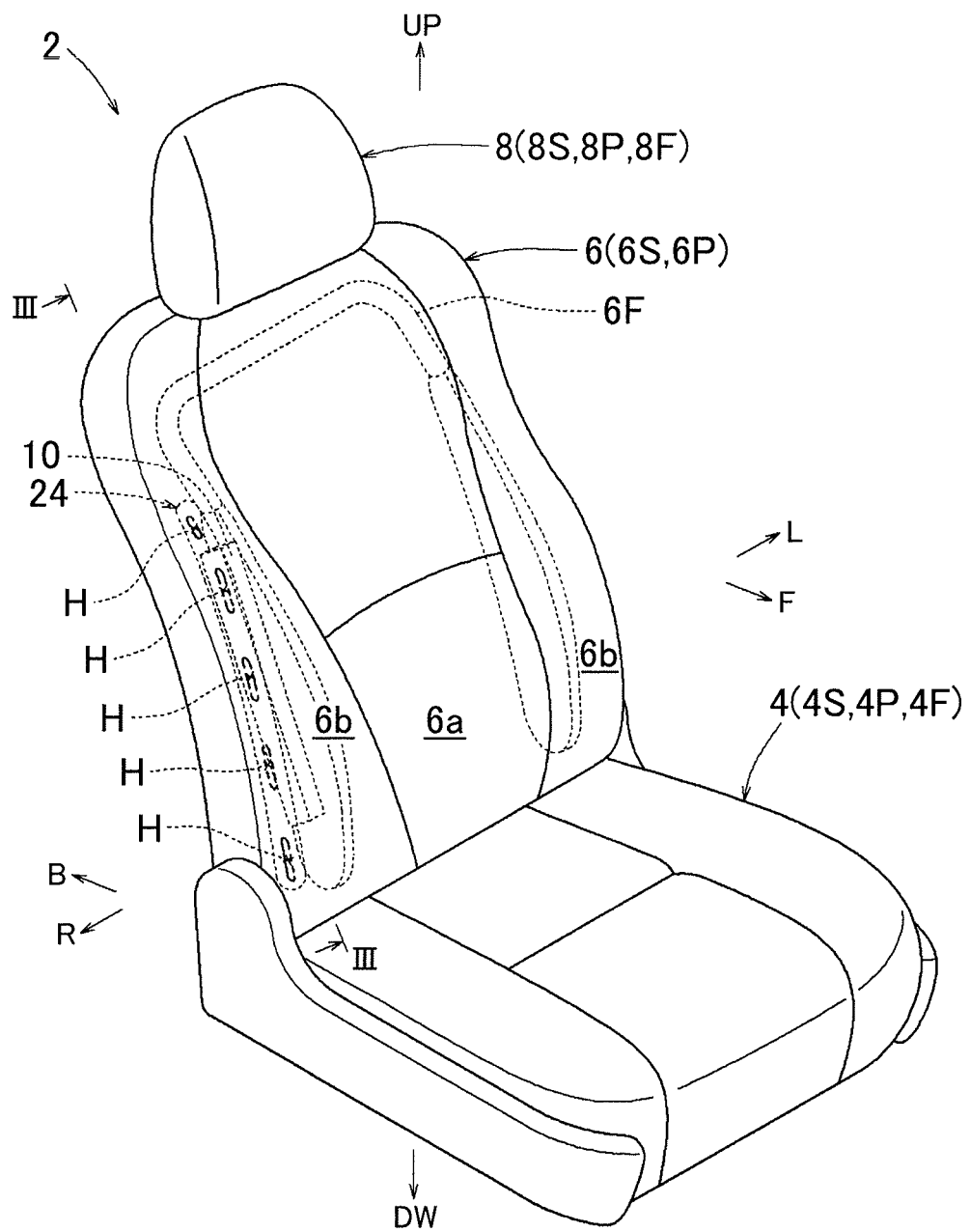
FIG. 1 is a perspective view of a vehicle seat.
Figure 2:
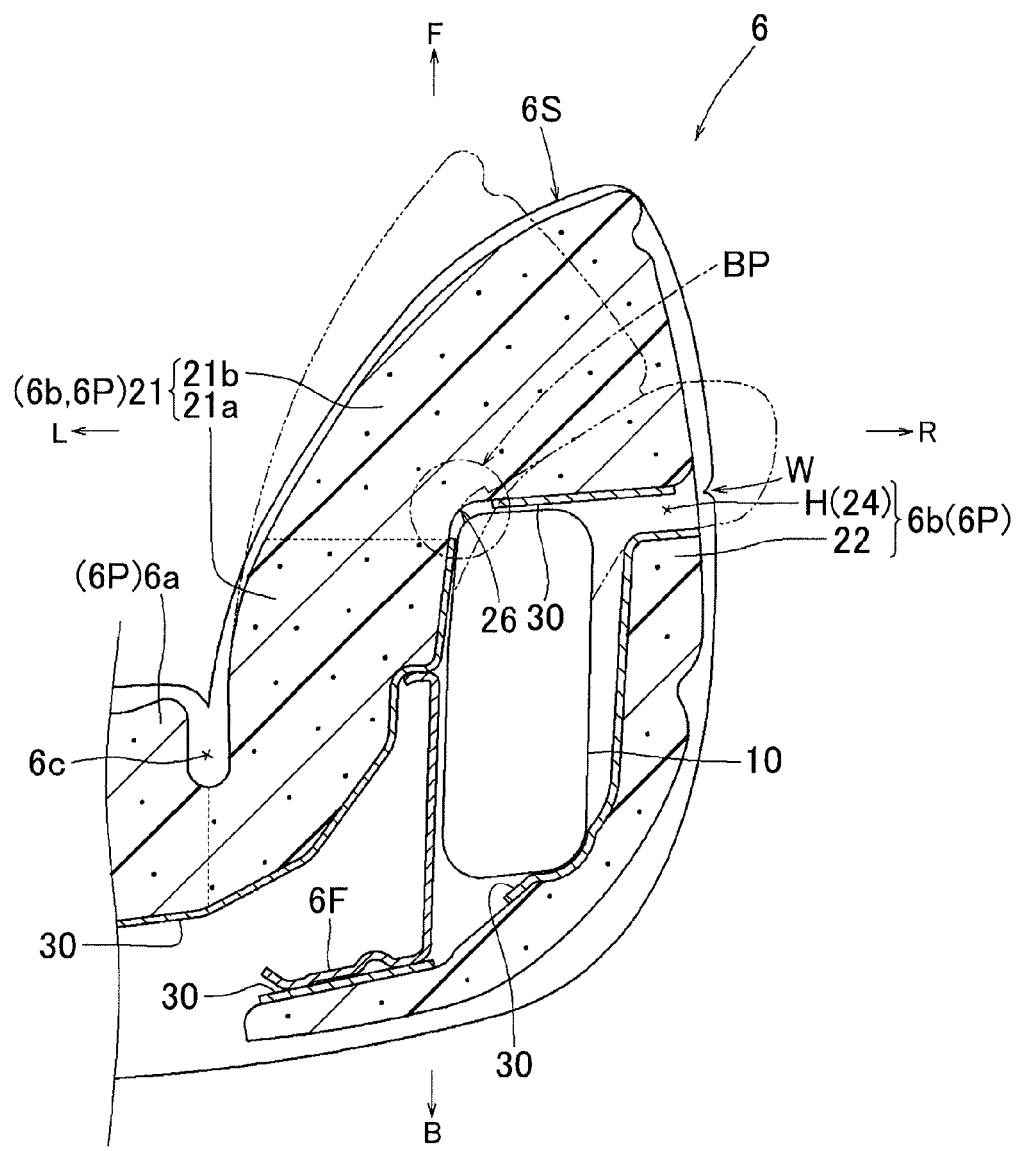
FIG. 2 is a cross-sectional view of part of a seatback.

Referring now to FIGS. 1 and 2, the seatback 6 of the present embodiment includes basic constituents (6F, 6P, 6S), an air bag 10, related constituents (a first unfolding portion 21, a second unfolding portion 22, a jump-out portion 24, a deformable portion 26, and a back-surface material 30) (details of each portion will be described later). Here, with reference to FIG. 1, the seat frame 6F is a generally arch-shaped frame body, and can be formed of a material (metal, hard resin, or the like) that has excellent rigidity. Further, with reference to FIG. 2, the seat pad 6P (details thereof will be described later) is a member that can elastically support an occupant, and can be formed of foam resin such as polyurethane foam (density: 10 kg/m$^3$ to 60 kg/m$^3$), for example. The seat cover 6S is a face material having a pouch-like shape, and can be formed of fabric (woven fabric, knitted fabric, nonwoven fabric) and leather (natural leather, synthetic leather). In the present embodiment, as will be described later, the seat pad 6P is placed on the seat frame 6F, and then covered with the seat cover 6S. Further, the air bag 10 (details thereof will be described later) is disposed inside a seat, and is placed on a back side of the seat pad 6P.

Referring now to a state indicated by the alternate long and two short dashed line in FIG. 2, at the time of a vehicle collision or the like, the air bag 10 jumps out of the seat from a side portion of the seatback 6, so as to protect a lateral part of the occupant. At this time, while the air bag 10 pushes part of the seat pad 6P (mainly, the first unfolding portion 21 on the sitting side) aside so as to jump out from the jump-out portion 24, the air bag 10 breaks the seat cover 6S (typically, a seam part W that is weak) and then jumps out of the seat. In this type of configuration, it is desirable that performance (a support characteristic or the like) of the seat pad 6P be maintained to the utmost and the air bag 10 jump out quickly by causing part of the seat pad 6P (mainly, the first unfolding portion 21) to be easily pushed aside toward the sitting side. In view of this, in the present embodiment, with a configuration to be described later, the air bag 10 is configured to jump out from the seat pad 6P quickly while maintaining the performance of the seat pad 6P to the utmost. The following describes each constituent more specifically.

Referring now to FIGS. 1 and 2, the air bag 10 (an unexpanded state) of the present embodiment is a member having a generally cube shape elongated in a seat up-down direction, and is disposed inside the side portion of the seatback 6. In the present embodiment, the air bag 10 is fixed to a flat-shaped side frame that forms a side portion of the seat frame 6F so as to be placed on a seat side face, and then covered with the seat pad 6P (a top-plate side portion 6b) to be described later. When the air flows into the air bag 10 in response to a signal indicative of a vehicle collision so that the air bag 10 expands and jumps out of the seat, the air bag 10 protects a body range from a chest of the occupant to a lumbar part of the occupant, for example. Note that a gas supply device is placed inside the air bag 10. Gas generant or high-pressure gas is enclosed in the gas supply device (an inflator).

Referring now to FIGS. 1 and 2, the seat pad 6P of the present embodiment has a generally rectangular shape (in a front view), and includes a top-plate main portion 6a, a top-plate side portion 6b, a groove 6c, and a back-surface material 30 (described later). Here, the top-plate main portion 6a is a flat part at a center of the seat pad 6P in the seat-width direction. Further, the top-plate side portion 6b is a projecting part placed on a lateral side of the top-plate main portion 6a, and can support a lateral part of the occupant at the time of cornering, for example. With reference to FIG. 2, the top-plate side portion 6b of the present embodiment has a generally transverse U shape (in a sectional view) that can cover a side portion of the seat frame 6F including the air bag 10, and includes the after-mentioned constituents (the first unfolding portion 21, the second unfolding portion 22, the jump-out portion 24). The groove 6c is a recessed portion formed on a sitting side of the seat pad 6P, and is formed between the top-plate main portion 6a and the top-plate side portion 6b, so that part of the seat cover 6S can be drawn therein via a clip or the like by burying the clip therein, for example.

Referring now to FIGS. 1 and 2, the jump-out portion 24 is a part which is fragile as compared with the other parts of the seat pad and from which the air bag jumps out. The jump-out portion 24 can be opened (or expanded) by a pressure or the like of the air bag 10 at the time of expansion. The jump-out portion 24 of the present embodiment is constituted by a plurality of through holes penetrating through the seat pad 6P in its thickness direction, and a seat-pad portion between through holes adjacent to each other, and the jump-out portion 24 is provided at a position at which the jump-out portion 24 can be opposed to the air bag 10 on a side face of the seat pad 6P. With reference to FIG. 1, the jump-out portion 24 of the present embodiment is configured such that the plurality of through holes is arranged in a row at given intervals in the up-down direction, based on an uprising state of the seatback, but the jump-out portion 24 may be constituted by a single through hole elongated in the up-down direction. Note that a cut line extending in the up-down direction may be formed in a seat-pad portion between through holes adjacent to each other, so that the jump-out portion 24 can be easily broken. A linear dimension (a linear dimension from a through hole in an upper end to a through hole in a bottom end) at a formation position of the jump-out portion 24 is not limited in particular as long as the air bag 10 can jump out therefrom, but typically, it is desirable that the linear dimension be set larger than a linear dimension of the air bag 10, so that the air bag 10 can be surely unfolded.

With reference to FIG. 2, the first unfolding portion 21 (an example of an unfolding portion of the present invention) is a part forming a sitting side of the top-plate side portion 6b, and the first unfolding portion 21 includes the after-mentioned deformable portion 26 and is placed on a front side (one side) of the jump-out portion 24. The first unfolding portion 21 of the present embodiment has a generally transverse L shape (in a sectional view), and includes a first part 21a that bends from the top-plate main portion 6a toward the sitting side (an F direction in FIG. 2), and a second part 21b extending outwardly (an R direction in FIG. 2) toward the seat-width direction from the first part 21a. The first unfolding portion 21 of the present embodiment is gradually thickened toward a seat outer side so as to project toward the sitting side, so that the first unfolding portion 21 has an excellent support characteristic. Further, the first unfolding portion 21 is gradually thickened from its upper part to its lower part based on an uprising state of the seatback, and a lower-part side that strongly receives a pressing force from the occupant (a lumbar part of the occupant) is relatively thick (see FIGS. 4 and 5). Further, the second unfolding portion 22 is a part (relatively thin) serving as a rear side of the top-plate side portion 6b, and the second unfolding portion 22 has a generally rectangular shape elongated in the seat front-rear direction in a sectional view in FIG. 2, and is placed on a rear side (the other side) of the jump-out portion 24.

With reference to FIG. 2, in the present embodiment, the air bag 10 in a state where the air bag 10 is placed inside the seat is covered with the first unfolding portion 21 and the second unfolding portion 22. At this time, the second part 21b of the first unfolding portion 21 is bent toward the seat outer side from the first part 21a so as to cover a sitting side of the air bag 10, and the second unfolding portion 22 covers a lateral side of the air bag 10. At the time when the air bag 10 jumps out (described later), the second part 21b of the first unfolding portion 21 is mainly pushed aside while curving toward the sitting side (deforming in a bending manner) with its bottom portion being taken as a base point BP. A part serving as the base point BP in the present embodiment is formed at the bottom portion of the second part 21b of the first unfolding portion 21, and is a thin part (a part having a relatively short minimum distance between a sitting face and a back surface) as compared with other parts of the second part 21b.

Here, with reference to FIG. 2, the back-surface material 30 is a face material attached to a back surface (a surface facing the seat frame 6F and the air bag 10) of the seat pad 6P. A material of the back-surface material 30 is not limited in particular, but felt and fabric can be exemplified. In the present embodiment, a face material (felt, fabric, or the like) that can be impregnated with a molding material of the seat pad 6P is used as the back-surface material 30. In the present embodiment, the back-surface material 30 can be attached to the back surface of the seat pad 6P at the same time as molding of the seat pad 6P. For example, the back-surface material 30 is put in a molding device (not shown) for the seat pad 6P, and then placed at a position corresponding to the back surface of the seat pad 6P. In this state, the molding material (fluid resin) of the seat pad 6P is supplied to the device and then foamed, so that the back-surface material 30 can be integrally attached to the back surface of the seat pad 6P while the seat pad 6P is molded. The back-surface material 30 thus attached is impregnated with the molding material of the seat pad 6P and the molding material is solidified, so that the back-surface material 30 is in a hardened state (a state in which the back-surface material 30 is hard to deform in a stretching manner).

With reference to FIG. 2, the deformable portion 26 is a part that easily deforms as compared with those other parts of the first unfolding portion 21 which are provided on a back side of the first unfolding portion 21, and the deformable portion 26 is provided at a part serving as the base point BP at the time when the first unfolding portion 21 is pushed aside by the air bag 10. The deformable portion 26 of the present embodiment is that part of the first unfolding portion at which the back-surface material 30 is removed (a part where no back-surface material 30 is disposed), and the deformable portion 26 is placed at the bottom portion (serving as the base point BP) of the second part 21b of the first unfolding portion 21. The deformable portion 26 is a part that easily deforms as compared with the other parts of the first unfolding portion (parts integrated with the back-surface material 30 in a solidified state), and the deformable portion 26 is elongated in the seat up-down direction and has a linear dimension that covers all the jump-out portion 24. In the present embodiment, at the time when the air bag 10 jumps out (described later), the deformable portion 26 (on the back side of the first unfolding portion 21) at the part serving as the base point BP deforms in a stretching manner in the seat width direction. Here, a formation method of the deformable portion 26 is not limited in particular, but the deformable portion 26 can be formed at the same time as molding of the seat pad 6P, for example. In the present embodiment, at the time of molding of the seat pad 6P, the part where no back-surface material 30 is disposed can be formed by providing that part in a predetermined part (a part corresponding to a formation position of the deformable portion 26) inside a forming device. Further, the deformable portion 26 can be formed by removing the back-surface material 30 from that part of the first unfolding portion 21 which serves as the base point BP, after the molding of the seat pad 6P.

Referring now to FIG. 2, at the time of a vehicle collision, the air bag 10 jumps out of the seat so as to protect the lateral part of the occupant. In the present embodiment, while the air bag 10 mainly pushes the first unfolding portion 21 aside toward the sitting side so as to jump out from the jump-out portion 24, the air bag 10 breaks the seam part W of the seat cover 6S and then jumps out of the seat (see the state indicated by the alternate long and two short dashed line in FIG. 2). At this time, the first unfolding portion 21 is pushed aside while curving toward the sitting side with a thin bottom portion of the second part 21b being taken as the base point BP. In the present embodiment, in consideration of an occupant support characteristic, the first unfolding portion 21 is made so as to be relatively thick (the first unfolding portion 21 is configured so as to be hard to be pushed aside). In this type of configuration, it is preferable that the air bag 10 jump out from the seat pad 6P quickly while maintaining the occupant support characteristic to the utmost.

In view of this, in the present embodiment, the deformable portion 26 (a part that relatively easily deforms in a stretching manner) is provided at that part of the first unfolding portion 21 which serves as the base point BP, so as to promote the first unfolding portion 21 to deform in a curved manner. Then, at the time when the air bag 10 jumps out and the first unfolding portion 21 curves, the second part 21b is pushed aside toward the sitting side while the deformable portion 26 is deformed in a stretching manner in the seat front-rear direction. Accordingly, in the present embodiment, the air bag 10 that expands smoothly pushes the second part 21b (relatively thick) of the first unfolding portion 21 aside, so that the air bag 10 can jump out from the seat pad 6P quickly.

As described above, in the present embodiment, the first unfolding portion 21 is easily pushed aside at the deformable portion 26. This accordingly allows the air bag 10 to jump out from the seat pad 6P quickly without thinning the first unfolding portion 21. Hereby, according to the present embodiment, the air bag 10 can jump out from the seat pad 6P quickly while maintaining the occupant support characteristic to the utmost.

Here, various configurations can be employed as the configuration of the deformable portion, in addition to the above configuration. For example, referring to FIGS. 3 to 5, a deformable portion 26A of Modification 1 is a recessed part on a back surface of a first unfolding portion 21, and is placed at that part serving as a base point BP which is placed at a bottom portion of a second part 21b of the first unfolding portion 21. The deformable portion 26A is formed as a thinned part having a generally round shape in a sectional view in FIG. 4, and the deformable portion 26A is elongated in the seat up-down direction and has a linear dimension that entirely covers a jump-out portion 24. In the present modification, at the time when an air bag 10 jumps out, the first unfolding portion 21 is pushed aside while curving toward a sitting side with the bottom portion of the second part 21b being taken as the base point BP. At this time, in the present modification, the first unfolding portion 21 is smoothly pushed aside toward the sitting side while the deformable portion 26A (the recessed part on a back side) is deformed in an expanding manner. Note that, in the present modification, the deformable portion 26A is a part where no back-surface material 30 is disposed, but the back-surface material 30 can be disposed along the deformable portion 26A like another example. By placing the back-surface material 30 along the deformable portion 26A as such, rigidity of this part can be maintained appropriately.

Figure 3:
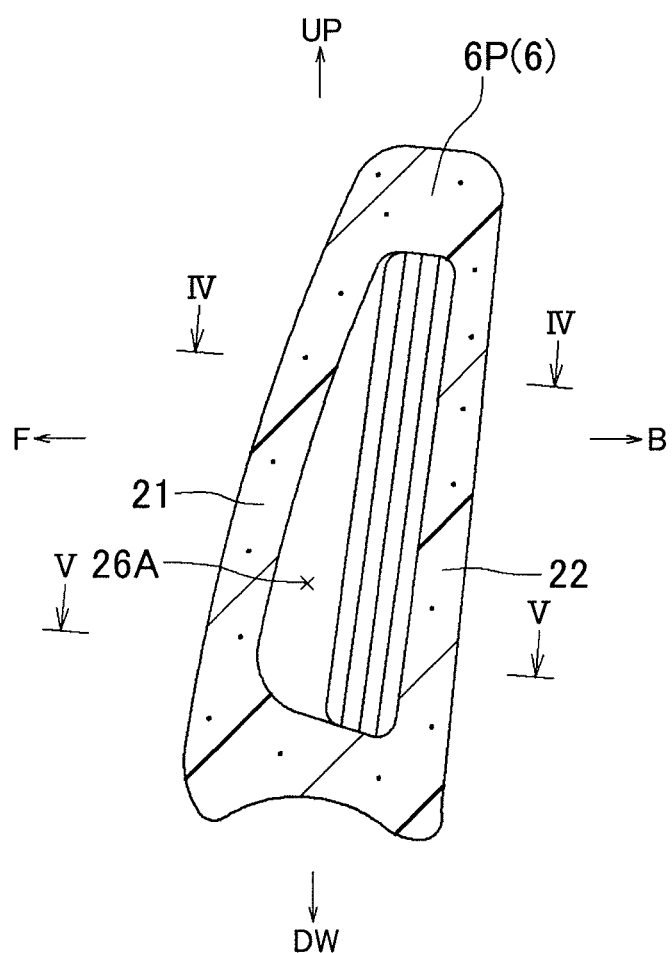
FIG. 3 is a schematic vertical sectional view of a seatback according to Modification 1 corresponding to a section taken along a line III-III in FIG. 1.
Figure 4:
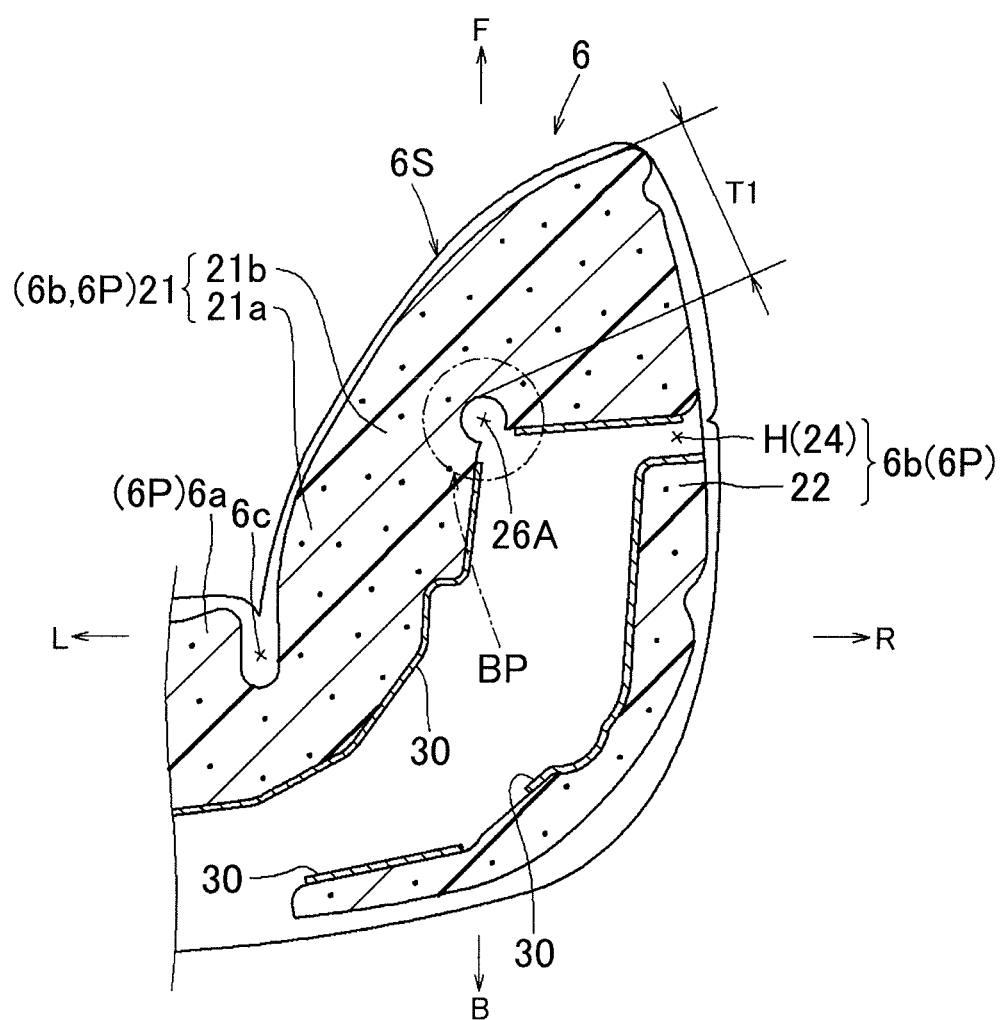
FIG. 4 is a cross-sectional view of part of the seatback corresponding to a section taken along a line IV-IV in FIG. 3.
Figure 5:
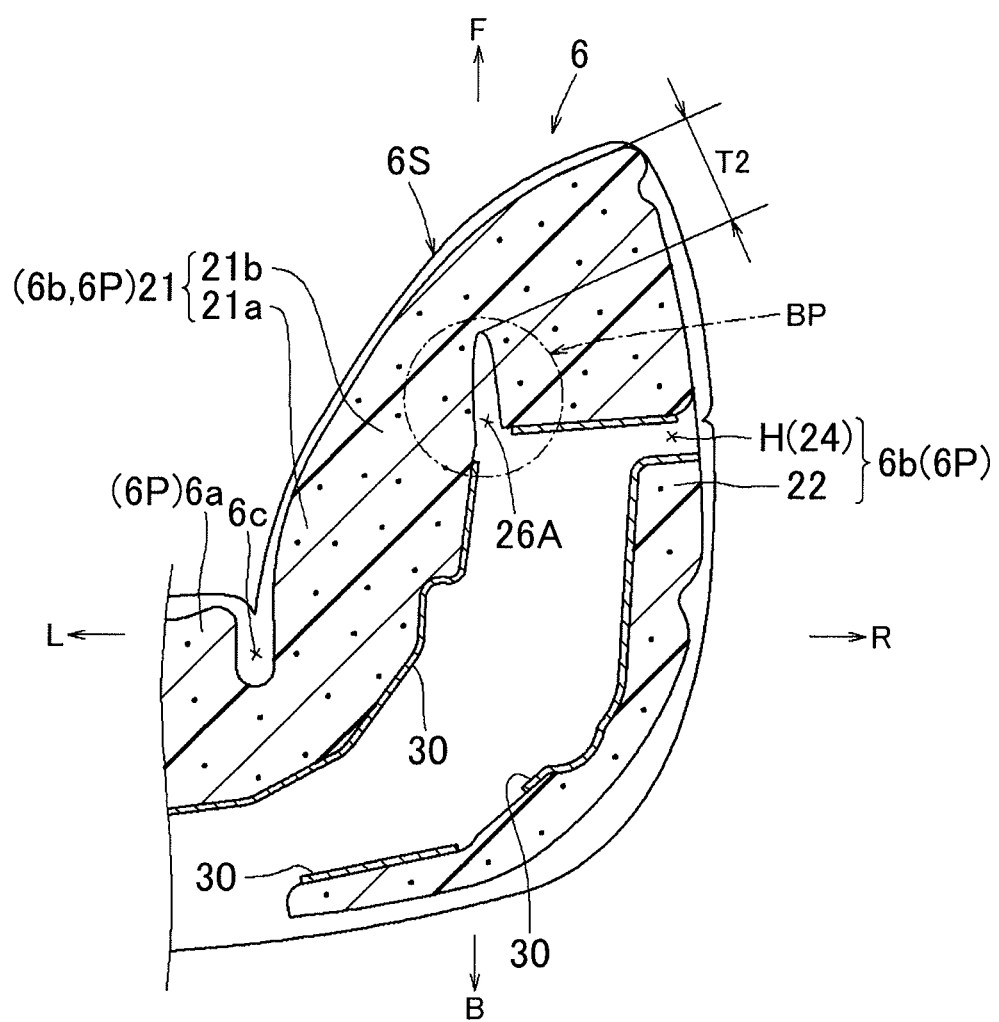
FIG. 5 is a cross-sectional view of part of the seatback corresponding to a section taken along a line V-V in FIG. 3.
Figure 6:
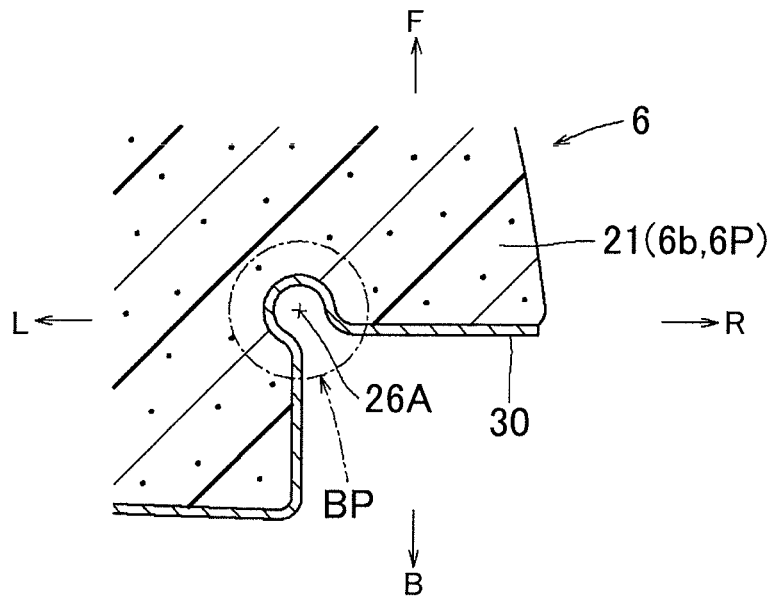
FIG. 6 is a cross-sectional view of part of a seatback according to another example.

With reference to FIG. 3, the first unfolding portion 21 of the present modification is gradually thickened from its upper part to its lower part based on an uprising state of the seatback, so that the first unfolding portion 21 is hard to be pushed aside. In view of this, in the present modification, a depth dimension of the deformable portion 26A (the recessed part) can be gradually increased as it goes toward the lower part from the upper part of the first unfolding portion 21. For example, in the present modification, the depth dimension of the deformable portion 26A (having a generally round shape in a sectional view) is set to be relatively small at the upper part of the first unfolding portion 21 (see FIG. 4). When a thickness dimension T1 (a minimum distance between a sitting surface and a back surface) on an upper side of the first unfolding portion 21 is set so as not to be extremely small as such, an extreme reduction of rigidity at this part can be prevented. Further, in a lower part of the first unfolding portion 21, the depth dimension of the deformable portion 26A is made large, so that a thickness dimension T2 in the lower part is substantially equal to the thickness dimension T1 of the upper part (see FIG. 5). As such, in the present modification, the thickness dimension of the first unfolding portion 21 (at the part serving as the base point BP) is substantially the same at its upper side and its lower side, so that the first unfolding portion 21 is configured to be easily pushed aside as a whole. Note that that the thickness dimension of the first unfolding portion 21 is substantially the same means that the thickness dimension is exactly the same, and also means that a difference in the thickness dimension due to some design deviations is allowed. Further, the deformable portion 26A is configured such that the upper part and the lower part of the first unfolding portion 21 have different sectional shapes. For example, in the present modification, a sectional shape of the deformable portion 26A at the upper part of the first unfolding portion 21 is a generally round shape, and a sectional shape of the deformable portion 26A at the lower part of the first unfolding portion 21 is a slit shape.

Figure 7:
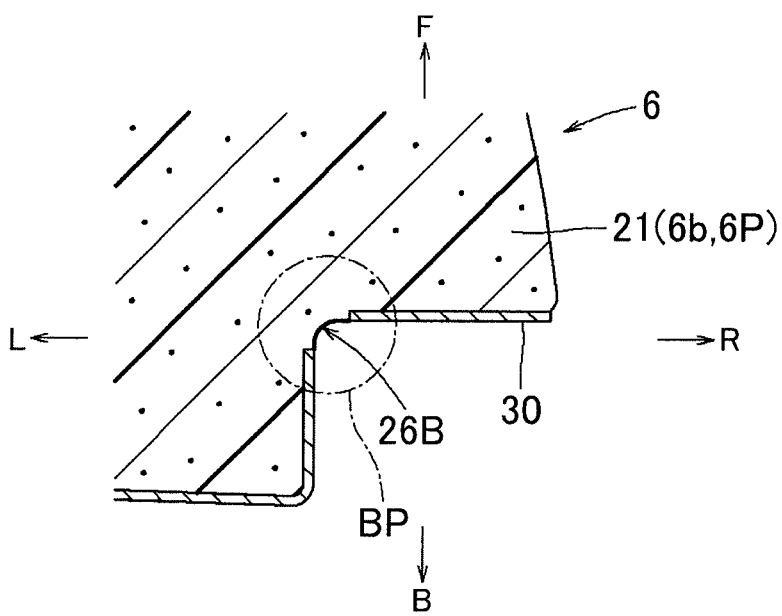
FIG. 7 is a cross-sectional view of part of a seatback according to Modification 2.

Further, with reference to FIG. 7, a deformable portion 26B of Modification 2 is a part where no back-surface material 30 is disposed (the same configuration as the above embodiment), and the deformable portion 26B is placed at a bottom portion (serving as a base point BP) of a second part 21b of a first unfolding portion 21. Further, in Modification 2, lubricant is applied to the deformable portion 26B (the part where no back-surface material 30 is disposed), so that the deformable portion 26B is slippery (in FIG. 7, a seat-pad portion to which the lubricant is applied is indicated by a thick line). The deformable portion 26B to which the lubricant is applied maintains a stretching characteristic derived from a seat pad 6P to the utmost, so that the deformable portion 26B is easily stretched as compared with the other parts of the first unfolding portion (parts integrated with the back-surface material 30). Since the deformable portion 26B is thus made slippery by application of the lubricant, when the deformable portion 26B makes contact with other members (an air bag 10 and the like) in a seat, abnormal noise (friction sound or the like) caused by the contact therebetween can be prevented appropriately. This type of lubricant may be a chemical agent that does not extremely obstruct the stretching characteristic of the deformable portion 26B, and silicon, grease, a copolymer between silicon and acryl, and a copolymer between silicon and urethane can be exemplified.

The vehicle seat of the present embodiment is not limited to the above embodiment, and other various embodiments can be employed. The present embodiment exemplifies configurations (a shape, a dimension, a formation position, a formation number, and the like) of the deformable portion 26 and so on, but is not intended to limit the configurations of these portions. For example, the deformable portion can be formed in at least one of the first unfolding portion and the second unfolding portion. Further, the deformable portion can be provided continually or intermittently in the seat up-down direction, and, for example, the deformable portion can be provided only in a part (e.g., a lower part) at which the unfolding portion is particularly thickened. Furthermore, the deformable portion may be configured such that a relatively easily deformable member (other seat pads and the like that are easily stretched as compared with a general seat unfolding portion) is placed at the part serving as the base point (for example, a configuration in which two-color molding is performed). Note that a part serving as the deformable portion may be configured to return to an original state at the time when the air bag is deflated, or may be configured to deform and break (not to return to an original state) at the time when the air bag jumps out.

Further, Modification 1 exemplifies, as the deformable portion 26A, a recessed part having a generally round shape and a slit shape (in a sectional view), but this is not intended to limit the configuration of this portion (a shape, a dimension, a formation number, a formation position, and the like). Further, in Modification 1, the first unfolding portion 21 (a part where the deformable portion 26A is formed) is configured such that the thickness dimension T1 of the upper part is substantially the same as the thickness dimension T2 of the lower part. Differently from this, as long as the deformation of the first unfolding portion is not extremely obstructed, the thickness dimension T1 of the upper part may be different from the thickness dimension T2 of the lower part (e.g., T2 may be larger or smaller than T1). Note that the deformable portion can be buried in other members that are easily stretched as compared with the unfolding portion.

Further, the configuration (a shape, a dimension, a placement position, and the like) of the unfolding portion 21 or the like can be modified appropriately according to other configurations of the air bag 10 and the like. For example, the air bag can be configured to jump out of a rear-face side of the seatback. At this time, the jump-out portion is formed on a rear face of the seatback, and the unfolding portion extends from the jump-out portion toward an upper part of the seat (or a lower part of the seat). In this type of configuration, when the air bag jumps out, the unfolding portion is pushed aside toward a seat upper side (or a seat lower side). Note that the part serving as the base point is set appropriately according to the configuration of the unfolding portion and the configuration of the air bag. For example, in a case where the part serving as the base point is formed on the sitting side, the deformable portion can be formed on the sitting side of the unfolding portion.

Further, the configuration (seat components, the air bag, and the like) of the vehicle seat 2 of the present embodiment can be modified appropriately. Further, in the present embodiment, the seatback is mainly described as an example, but the configuration of the present embodiment is applicable to various seat components such as a seat cushion. Further, the configuration of the present embodiment is applicable to general vehicle seats of a vehicle, an aircraft, an electric railcar, and the like.

What is claimed is:
1. A vehicle seat comprising:
   a seat pad forming a seat outer shape and elastically supporting an occupant; and
   an air bag placed on a back side of the seat pad and configured to be expandable due to an inflow of air, wherein
   the seat pad has a jump-out portion which is fragile as compared with other parts of the seat pad and from which the air bag jumps out from the back side of the seat pad, and an unfolding portion extending from the jump-out portion toward one side of the seat,
   when the air bag jumps out from the jump-out portion while pushing the unfolding portion aside toward the one side of the seat, the unfolding portion is pushed aside while deforming in a bending manner from a base point at the time when the unfolding portion is pushed aside by the air bag,
   the unfolding portion includes a deformable portion that is easy to deform as compared with other parts of the unfolding portion, the deformable portion being placed at the base point, the deformable portion being provided in an up-down direction of the vehicle seat based on an uprising state of the seatback, and an upper part of the deformable portion in the up-down direction of the vehicle seat has a depth dimension smaller than that of a lower part of the deformable portion, and
   at the time when the air bag jumps out, the deformable portion deforms so as to promote the unfolding portion to deform in the bending manner so that the unfolding portion is pushed aside toward the one side of the seat.
2. The vehicle seat according to claim 1, wherein the deformable portion is a recessed part.
3. The vehicle seat according to claim 1, wherein the seat pad is a seat pad for a seatback.
4. The vehicle seat according to claim 1, wherein
   the seat pad includes a back-surface material on a surface facing the air bag; and
   the deformable portion is a part where the back-surface material is not provided.
5. The vehicle seat according to claim 1, wherein the deformable portion is provided with a lubricant.
6. The vehicle seat according to claim 1, wherein
   an upper part of the unfolding portion in the up-down direction of the vehicle seat has a thickness dimension that is substantially the same as a thickness dimension of a lower part of the unfolding portion in the up-down direction of the vehicle seat.

* * * * *